United States Patent Office 3,502,627
Patented Mar. 24, 1970

3,502,627
N-ACRYL(POLYOXYALKYL)-OXAZOLIDINES AND N - ACRYL(POLYOXYALKYL) - TETRAHYDRO-1,3-OXAZINES AND SALTS THEREOF
John A. Dupont, North Hills, Pa., assignor to Rohm & Haas Company, Philadelphia, Pa., a corporation of Delaware
No Drawing. Filed Jan. 6, 1966, Ser. No. 532,015
Int. Cl. C08f 15/16, 3/64
U.S. Cl. 260—86.1     3 Claims United States Letters Patent 3,037,006, May 29, 1962, discloses the production of N-acryloxyalkyl-oxazolidines and N-acryloxyalkyl-tetrahydro-1,3-oxazines, polymers thereof, and amine hydrolysis products of both monomers and polymers. In these earlier monomers, the alkyl group joining the acryloxy oxygen to the heterocyclic nitrogen has 2 to 3 carbon atoms, extending in a chain between the oxygen and nitrogen atoms. It has now been found that the initially formed secondary amine-containing groups obtained by hydrolysis of the monomer or polymer are converted into neutral amide groups which lack valuable properties of the basic amine group. This conversion, which may be termed an intramolecular "flip-flop" occurs very rapidly at neutral to alkaline conditions and may be typically represented by the following equation:

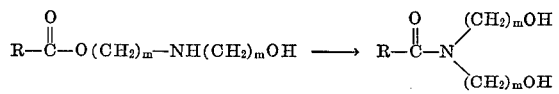

wherein R may represent either the vinyl or alpha-methyl vinyl group in the case of the monomers or the polymer residue in case of the polymers, and $m$ is an integer, 2 or 3.

In accordance with the present invention, novel monomeric oxazolidines are produced having the general formula:

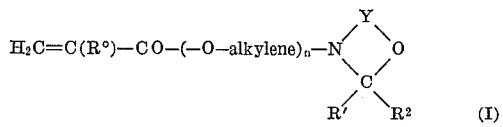

wherein
R° is H or methyl,
(—O—alkylene)$_n$ is a poly(oxyalkylene) group, having a molecular weight in the range from 88 to 348, in which the individual alkylene radicals are the same or different and are either ethylene or propylene,
Y is ethylene or propylene (i.e., methyl-substituted ethylene), or trimethylene,
R', when not directly joined to R², is H, phenyl, benzyl, or a (C$_1$–C$_{12}$)alkyl group,
R², when not directly joined to R', is H or a (C$_1$–C$_4$) alkyl group, and
R' and R², when directly joined together, form a 5- to 6-carbon ring with the attached carbon atom of the ring in the formula, i.e., the joint R' and R² group is a tetramethylene or pentamethylene group.

Preferred compounds are those in which the poly(oxyalkylene) group has a molecular weight in the range from 88 to 174.

In the nomenclature herein the numbering of the members of the ring in Formula I is as follows:

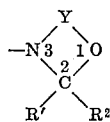

The carbons of Y in the ring then become 4 and 5, or 4, 5, and 6.

The compounds designated hereinabove may be prepared by the reatcion of a halide (and especially a chloride) of acrylic or methacrylic acid with a hydroxy compound of Formula II hereinafter or by transesterification of an ester of acrylic acid or methacrylic acid, such as methyl methacrylate or methyl acrylate, with a hydroxy compound of the Formula II

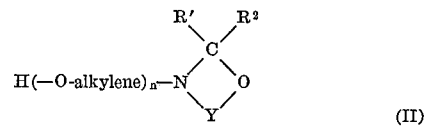

wherein the symbols are as defined above.

The reaction involving the acrylyl halide is carried out in a suitable inert solvent, such as acetonitrile, ethers in general, e.g., ethyl ether, and ethylene glycol dimethyl ether, and chlorinated hydrocarbons, e.g., chloroform, and hydrocarbons, such as toluene, xylene, and benzene. The reaction is generally carried out by mixing the alcohol of Formula II into the solvent, adding an excess of a tertiary amine, such as triethylamine, or of an inorganic carbonate, such as an alkali metal carbonate, and then gradually adding the acrylyl halide at room temperature, with cooling, if desired. The amine or carbonate serves as a hydrogen halide acceptor.

The transesterification may be carried out in essentially the same way as described in United States Patent 3,037,006 and the description thereof is incorporated herein by reference.

The compounds of Formula II may be obtained by reacting ethylene oxide or propylene oxide with a basic polyether of the Formula III

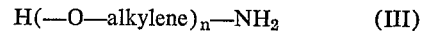

wherein the symbols are as indicated hereinabove, to produce a compound of Formula IV

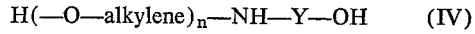

and then reacting that compound with an aldehyde or ketone.

The simpler compounds of Formula III are available commercially, but they are all obtainable by the procedures disclosed in United States Patents 3,110,732 and 3,161,682.

The reaction of a compound of Formula III with ethylene oxide or propylene oxide may be carried out in an autoclave at a temperature from about 0° to 200° C. and a pressure of 0 to 100 pounds per square inch (gage). No solvent is needed nor is any catalyst needed, it being merely necessary to pass the alkylene oxide into the basic polyether of Formula III within a suitable reaction vessel adapted to maintain whatever temperature and/or pressure is or are desired in the reaction system. If desired, there may be used 0.1 to 10% by weight, based on the weight of basic polyether, of an alkali metal alkoxide, such as sodium methoxide or ethoxide, but this is not essential. The mole ratio of basic polyether to alkylene oxide is generally in the range of 1:2 to 10:1 and preferably is in the range of 2:1 to 3:1. A solvent, such as toluene or xylene may be used, but is not necessary. The product may be recovered from the reaction mixture by distillation.

The resulting condensate of Formula IV is reacted with an aldehyde or ketone, such as any of those listed in column 2, lines 3 to 38 of 3,037,006, but preferably formaldehyde, to form the alcohol of Formula II. The reaction may be effected in bulk or within an inert solvent such as xylene, benzene, or toluene, adapted to form an azeotrope with the water to aid in its removal. The mixture is heated to a temperature of 100° C. or higher depending on the pressure in order to distill water.

The monomers of the present invention, having Formula I hereinabove, are colorless to yellow liquids and are reasonably stable at room temperature although if they are to be stored over long periods of time, it is advisable to maintain them under refrigeration. These monomers are characterized by two points of reactivity, one being the double bond in the acrylyl portion of the molecule by virtue of which the compounds are adapted to polymerize by the typical vinyl addition process to form linear polymers and copolymers. The cyclic oxazolidine group is hydrolyzable under acid conditions to form a novel secondary amine salt which is polymerizable.

The hydrolyzed monomers are salts of amines having the general formula

$$H_2C=C(R°)CO-(O-alkylene)_n-NH-Y-OH \quad (VI)$$

wherein the symbols are as defined hereinabove. These monomers do not undergo conversion to a neutral hydroxyl-containing acrylamide or methacrylamide nor do the polymers obtained from VI or by hydrolysis, as described hereinafter, of the polymers of a compound of Formula I. The presence of the basis amine group in such polymers provides therein the characteristic of outstanding adhesion to a wide variety of substrates, such as bare metals, including steel, aluminum, bronze, and copper, also metals primed with conventional commercial primers based on aminoplast condensates, such as urea-formaldehyde, melamine- formaldehyde, phenol-formaldehyde condensates and their alkylated, such as methylated to butylated derivatives, on alkyd resins, especially oil-modified resins, vic-epoxy resins, and mixtures of these several types of coating compositions. Furthermore, the fact that the polymers are not subject to the intramolecular "flip-flop" mentioned heretofore assures the permanent retention of the high degree of adhesion provided by the basic amine group. Thus copolymers containing ½% to 15% by weight of an oxazolidine or of a tetrahydro-1,3-oxazine of Formula I or of an amine, or salt thereof, of Formula VI may be used as an automotive lacquer, either as a prime, intermediate, or topcoat or for any two or all of these coats. They may also be used as lacquers or enamels on household appliances, such as stoves, refrigerators, and the like.

The amines of Formula VI more or less rapidly undergo a Michael addition reaction unless they are stabilized by conversion to a salt form. While any acid or acid salt may be used for converting the amine to salt form it is preferred, from the standpoint of stability against Michael addition, that a reasonably strong acid be used for forming the salt of the amine of Formula VI. Thus it is preferable that the acid be one whose pKa is not over 3. When reference is made to the polymerization of the hydrolyzed monomer herein, it is to one of the preferred salts that is meant or intended since they are readily polymerized by vinyl addition polymerization without interference by virtue of Michael addition.

One the amine salts are polymerized, the polymers can be neutralized by means of bases such as an alkali metal hydroxide or ammonium hydroxide to produce the free base form of the polymers. Alternatively, the acid may be removed from the polymer salt by treatment with an anion exchange resin.

Thus as will appear hereinafter, there are two ways in which polymers containing amine groups in free base form can be obtained in accordance with the present invention. The first is that just described wherein an amine salt of Formula VI is polymerized and a polymer is then neutralized to free base form. The second is to polymerize an oxazolidine or a tetrahydro-1,3-oxazine of Formula I, hydrolyze the resulting polymer to form the polymer containing a secondary amine or its salt depending on whether acid is present during the hydrolysis and, in the latter instance, treating the polymer amine salt with an ion exchange resin or neutralizing to liberate the free amine form of the polymer.

The polymers containing an amine of Formula VI may be used in either neutral, acid, or basic form or under any of these conditions.

Aqueous dispersions of copolymers containing ½ to 15% or more (by weight) of an amine of Formula VI obtained by emulsion copolymerization either of an oxazolidine of Formula I or of an amine salt of Formula VI with at least one other monoethylenically unsaturated monomer having a group of the formula $H_2C=C<$ can be formed into water base paints which adhere well to a wide variety of substrates such as wood, either bare or carrying a fresh or a weatherbeaten prior coat of paint, concrete, asbestos, cement shingles, stucco, concrete and cinder blocks, bricks, stones, and so forth.

This hydrolysis of the oxazolidine or tetrahydro-1,3-oxazine groups to secondary amine groups may be effected on a polymer of the unsaturated oxazolidine or oxazine yielding an amino(alkoxy)$_n$ alkyl acrylate or methacrylate polymer in which the amine group contains a secondary nitrogen atom. Such novel acryate and methacrylate polymers carrying a basic nitrogen atom attached to a carbon atom and having one hydrogen atom attached to it have been prepared for the first time by the present invention, and these polymers are part of the invention herein claimed.

The monomeric compounds of Formula I may be suspended in an aqueous medium preferably in particulate form and upon acidification of the medium such as by means of acetic acid, phosphoric acid, sulfuric acid, and the like, the monomer is hydrolyzed to a secondary amine which forms a salt of the acid present. This salt is polymerizable in aqueous systems. Thus, it may be dissolved in water and polymerized by water-soluble initiators or catalysts, such as ammonium persulfate, optionally with a reducing agent, such as potassium metabisulfite in a redox system. Such polymers have high molecular weight and are applicable as a wet-strength resin in paper and for the flocculation of suspended matter in aqueous media to facilitate filtration, settling, and/or decantation.

The polymers and copolymers of the oxazolidines or tetrahydro-1,3-oxazines of Formula I may be prepared by either a bulk, a solvent, or an aqueous emulsion technique using, in the case of solution polymerization, organic solvents such as benzene, toluene, xylene, acetone, dioxane, dimethylformamide, and acetonitrile, and azo catalysts such as diazodiisobutyronitrile and dimethyl-$\alpha,\alpha'$-azodiisobutyrate. The proportion of azo catalyst or initiator may be between 0.1% and 5% and is preferably between about 0.5% and 1.5%, on the weight of the total polymerizable materials.

The compounds of Formula I can be copolymerized with various other ethylenically unsaturated monomers, and especially monoethylenically unsaturated monomers adapted to produce linear copolymers. Thus, copolymers may be made containing from about 0.5% to 99.5% by weight of a compound of Formula I with at least one of the following monomers: vinyl acetate, acrylonitrile, acrylamide, methacrylamide, styrene, vinyltoluene, vinylidene chloride, vinyl chloride, vinyl laurate, esters of acrylic acid or methacrylic acid having from 1 to 18 carbon atoms in the alcohol moiety such as methyl methacrylate, methyl acrylate, ethyl acrylate or methacrylate, 2-ethylhexyl acrylate or methacrylate, dodecyl acrylate or methacrylate and octadecyl acrylate or methacrylate.

The polymers and copolymers may be used in the formation of coatings, impregnants, and adhesives for paper, textiles, leather, wood and metals. Copolymers containing from 5 to 25% by weight of the unsaturated oxazolidines or tetrahydro-1,3-oxazines of the invention can be mixed with polyepoxides for the production of insoluble and infusible cross-linked coatings. The copolymers may be employed in conjunction with other polymeric material for the production of special compositions for special uses. For example, copolymers prepared by the polymerization of an oxazolidine or tetrahydro-oxazine of Formula I in the presence of glue results in a polymer which is soluble in water and serves efficiently for the flocculation of suspended matter of either organic or inorganic material in aqueous media to facilitate the filtration or the settling and decantation of the system. Emulsion polymers of an oxazolidine or tetrahydro-1,3-oxazine of the present invention are useful also for the binding of pigments, for the stabilization of wool fabrics against shrinkage on laundering, and for the binding of fibers in nonwoven fabrics. For this purpose, they may be used in conjunction with a polyepoxide of water-soluble or dispersible character. The bonded nonwoven fabrics have good to excellent wash-resistance.

Examples of epoxides that may be employed include both water-dispersible and/or organic solvent-soluble types such as the "ethoxyline resins" available under the trade names of Epon or Araldite resins. They are polyether derivatives of a polyhydric phenol containing epoxy groups and may be prepared by effecting reaction between a polyhydroxyphenol or alcohol, for example, hydroquinone, resorcinol, glycerine, or condensation products of phenols with ketones, for instance, bis(4-dihydroxydiphenol)-2,2-propane, and epichlorohydrin.

The polymers of the oxazolidines or oxazines of Formula I can be treated with an acid, such as acetic acid or phosphoric acid, while suspended in water to effect hydrolysis of the oxazolidine or oxazine group to secondary amine nitrogen groups (see Formula VI). This is a very rapid reaction even at room temperature, but in some cases, it may be accelerated by raising the temperature. The polymers thereby obtained have uses similar to those of the unhydrolyzed oxazolidine or oxazine. They are useful for the making of adhesives and coatings of thermosetting character, especially when mixed with epoxides, binders for non-woven fabrics and for pigments in the pigment-dyeing and printing of textiles, and as lubricating oil additives having sludge dispersing qualities, for improving the viscosity and index and pour pont characteristics. They may be used for the stabilization of wool against shrinkage on washing and for the imparting of wet-strength to paper. These polymers may also be used in the poper industry as beater deposition aids wherein they serve as anchoring agents for adhering all sorts of sizing, filling, and finishing materials for paper, such as mineral pigments and fillers, rosin sizes, rubber latices, and synthetic emulsion polymer dispersions, such as of polyvinyl acetate, polyethyl acrylate, etc., and as pigment retention aids in the filling of papers. They are also useful as flocculating agents to clarify, facilitate settling in, and to speed up filtration of, aqueous suspensions of both organic and inorganic matter including sewages and domestic and industrial wastes of all types.

To assist those skilled in the art to practice the present invention, the following modes of operation are suggested by way of illustration, parts and percentages being by weight, pressures being in millimeters of mercury, and the temperatures in ° C. unless otherwise specifically noted.

MODES OF OPERATION (1)(a) Preparation of N-(2-hydroxyethyl)-2-(2-hydroxy-ethoxy)-ethylamine In to an autoclave equipped with a mechanical stirrer there is charged 526 g. (5.0 moles) of diglycolamine (i.e., 2-(2-hydroxyethoxy)-ethylamine). The reaction vessel is heated to 100° while stirring and 110 g. (2.5 moles) of ethylene oxide is charged over a period of approximately forty-five minutes. During this time the reaction temperature reaches a maximum of 140°. After the addition of ethylene oxide the reaction solution is allowed to stir for one-half hour and is then cooled to room temperature. Distillation of the reaction mixture provides 305 g. of unreacted diglycolamine, boiling range 60–70°/0.3 mm. and 221 g. (59% yield based on ethylene oxide) of the desired product, N-(2-hydroxyethyl)-2 - (2 - hydroxyethoxy)ethylamine, a colorless liquid, $n_D^{26}$ 1.4736, boiling in the range of 121–123°/0.35 mm.

*Analysis.*—Calc'd for $C_6H_{15}NO_3$ (percent): C, 48.31; H, 10.13; N, 9.39. Found (percent): C, 48.15; H, 10.18; N, 9.57.

(b) Preparation of N-2-(2-hydroxyethoxy)ethyl-oxazolidine

Into a one-liter three-necked flask equipped with a mechanical stirrer and a Dean-Stark trap surmounted with a condenser and drying tube there is placed 210 g. (1.4 moles) of N-(2-hydroxyethyl) - 2 - (2 - hydroxyethoxy)ethylamine (part (*a*)) 44.3 g. (1.4 moles) of paraformaldehyde (95%) and 500 ml. of toluene. The mixture is heated to reflux and 26.5 ml. (97% yield) of water is collected within one hour. The toluene is removed by distillation and the resulting liquid residue is distilled under reduced pressure through a 10-inch Vigreux column. The product, N-2-(2-hydroxyethoxy) ethyl oxazolidine, a colorless liquid boiling in the range of 98–101°/0.05 mm., $n_D^{26}$ 1.4750, and weighing 167.3 g. (74% yield) is obtained.

Neutralization equiv. ($HClO_4$/HOAc).160.3 (calc'd 161.2).

*Analysis.*—Calc'd for $C_7H_{15}NO_3$ (percent): C, 52.15; H, 9.38; N, 8.70. Found (percent): C, 52.30; H, 9.43; N, 8.65.

(c) Preparation of N-2-(2-methacryloxyethoxy) ethyl-oxazolidine

Into a one-liter three-necked flask equipped with a thermometer, a mechanical stirrer and a 10-inch Vigreux column fitted with an isothermal distillation head (protected with a drying tube), is placed 161.2 g. (1.0 mole) of N-2-(2-hydroxyethoxy)ethyl-oxazolidine (part (*b*)), 500 g. (5.0 moles) of methyl methacrylate and 2.0 g. of di-(p-hydroxyphenyl) amine. The reaction mixture is heated to reflux and 5 ml. of distillate is collected. Sodium methoxide (25% solution in methanol), 2.2 g., is added and the take-off temperature is set at 85°. Over a 1.5 hr. period 29.3 g. of distillate (19.3 g. MeOH) is collected. An additional 1.1 g. of sodium methoxide solution is added and the distillate, 32.2 g. (11.9 g. MeOH), of B.P. <90° is collected over a one-hour period. Further distillation, employing unlimited (temperature) take-off, is carried out until approximately an additional 100 g. of distillate is collected. The reaction mixture is then stripped under reduced pressure and subsequently distilled through a 10 inch Vigreux column. The distillate, 79.5 g. (31.5% yield) boiling in the range 127–30°/0.6 mm. is collected. Gas liquid chromatographic (g.l.c.) analysis shows that the material contains 91% of the desired product, N-2-(2-methacryloxyethoxy)ethyl-oxazolidine. Redistillation provides a sample of B.P. 113°/0.1 mm., $n_D^{25}$ 1.4679 having a purity of >97% (g.l.c.). Titration ($HClO_4$/HOAc) reveals an equivalent weight of 228.2 (calc'd 229.3).

*Analysis.*—Calc'd for $C_{11}H_{19}NO_4$ (percent): C, 57.59; H, 8.49; N, 6.20. Found (percent): C, 57.62; H, 8.35; N, 6.11.

(2) An aqueous dispersion of an emulsion polymer is prepared in the following manner: a stabilized emulsion consisting of 132 g. of ethyl acrylate, 64 g. of methyl methacrylate, 4.0 g. of N-2-(2-methacryloxyethoxy)ethyl-oxazolidine 570 g. of deionized water, 17.1 g. of a 70% aqueous solution of diisobutylphenoxypoly-(40)ethoxyethanol and 2.0 ml. of a solution containing 0.1% $FeSO_4 \cdot 7H_2O$ and 0.1% Versene (tetrasodium salt of ethylene diamine tetracetic acid) is cooled with stirring to 15°. Polymerization is initiated by the addition of 0.2 g. $(NH_4)_2S_2O_8$ in 10 ml. of water and 0.2 g. of sodium hydrosulfite in 10 ml. of water, and by the later (15 min.) addition of 0.1 g. of sodium formaldehyde sulfoxylate in 5 ml. of water and 0.1 ml. of tert.-butyl hydroperoxide (TBHP). The ensuing exotherm produces a maximum temperature of 60°. When the temperature begins to fall, an additional 0.1 g. of sodium formaldehyde sulfoxylate in 5 ml. of water and 0.1 ml. of TBHP is added and cooling is allowed to continue to room tempertaure. The resulting dispersed polymer, a copolymer containing about 66% ethyl acrylate, 32% methyl methacrylate and about 2% of N-2-(2-methacryloxyethoxy)ethyl-oxazolidine, is concentrated by evaporation at ambient temperatures to a total solids content of 48.0% and the pH is adjusted with ammonium hydroxide to 9.5. The functional monomer incorporation, based on nitrogen analysis of precipitated (acetone) polymer, is 94.8%.

Air dried films of the dispersion deposited on alkyd, wood and stainless steel substrates show good to excellent adhesion thereto, apparently the result of the basic oxazolidine moiety and/or the secondary amine resulting from the hydrolysis thereof, since analogous copolymers free from oxazolidine and secondary amine show comparatively less adhesion.

(3)(a) Preparation of N-(2-hydroxypropyl)-2-(2-hydroxy-ethoxy)ethylamine

Into an autoclave there is charged 526 g. (5.0 moles) of diglycolamine and 145 g. (2.5 moles) of propylene oxide. The solution is heated at 100° for 2 hrs., then cooled to room temperature. Distillation of the resulting reaction solution affords 212 g. (52% yield) of N-(2-hydroxypropyl) - 2 - (2-hydroxyethoxy)ethylamine, a colorless, mobile liquid.

(b) In the same manner as in (1)(b) above, 163 g. (1.0 mole) of N - (2 - hydroxypropyl)-2-(2-hydroxyethoxy)-ethylamine, 31.6 g. (1.0 mole) of 95% paraformaldehyde in 400 ml. of benzene is allowed to react over a 2 hr. period. During this time the theoretical amount of water is obtained. The solvent is removed from the reaction solution under reduced pressure followed by distillation of the resulting liquid residue. The product, N - 2 - (2 - hydroxyethoxy)ethyl-5-methyl-oxazolidine, is obtained in 80% yield.

(c) In the same manner as in (1)(c) above, 175 g. of N-2-(2-hydroxyethoxy)ethyl-5-methyl-oxazolidine and 500 g. (5.0 moles) of ethyl acrylate, are allowed to react in the presence of 2.0 g. of N,N'-diphenyl-p-phenylenediamine inhibitor; tetraisopropyltitanate, (5.6 g.) is employed as the transesterification catalyst in place of sodium methoxide. Over a six-hour period, approximately the theoretical amount of ethanol is obtained as indicated by the refractive index of the distillate. The remaining ethyl acrylate is removed under reduced pressure and the resulting dark-colored, liquid product is distilled at 150°/0.5 mm., employing a wiping film still. The slightly yellow distillate (137 g.) provides a 60% yield of N-2-(2-acryloxyethoxy)ethyl-5-methyl-oxazolidine.

(4)(a) By the procedure of Example II of U.S. 3,-110,732 except that only 47.5 ml. of propylene oxide is used instead of 95 ml. thereof, the followings basic polyether having a neutral equivalent of about 285 is obtained:

$$H_2N-(C_2H_4O)_2-(C_3H_6O)_n-H$$

in which the average value of $n$ is 3.1.

(b) The N-(2-hydroxypropyl) substitution product of the basic polyether of part (a) is obtained by the procedure of (3) (a) using 43 g. (0.15 mole) of the basic polyether of part (a) hereof and 4.5 g. (0.075 mole) of propylene oxide.

(c) 23 g. (0.067 mole) of the basic polyether of part (a) hereof is mixed with 3 g. (0.068 mole) of acetaldehyde and 80 ml. of toluene. The mixture is heated to reflux and after completion of the reaction is indicated by removal of about 1.2 g. of water, the toluene is distilled off and about 18.6 grams of 3-[2-(HO(propoxy)$_{3.1}$-(ethoxy$_2$)ethyl]-2-methyl-4(or 5)-methyloxazolidine remains.

(d) The 3 - [2-(methacryloxy(propoxy)$_{3.1}$-(ethoxy)$_2$) ethyl]-2-methyl-4(or 5)-methyl-oxazolidine is obtained by the transesterification procedure of (1) (c) hereinabove and the alcohol of part (c) hereof.

(5) By the procedure of (1)(b) above, except that 1.4 moles of cyclohexanone is used in place of the paraformaldehyde, the product 3 - [2 - (2-hydroxyethoxy) ethyl)]-2,2-pentamethylene-oxazolidine may be obtained. This may then be reacted with methyl methacrylate by transesterification to form 3-[2-(2-(methacryloxyethoxy) ethyl)]-2,2-pentamethylene-oxazolidine.

(6) By repeating the steps of procedure (5) except acetone is used in place of the cyclohexanone, there may be obtained 3-[2-(2-(methacryloxyethoxy)ethyl)]-2,2-dimethyl-oxazolidine.

(7) Similarly by repeating of (5) using benzaldehyde instead of cyclohexanone there may be obtained 3-[2-(2-methacryloxyethoxy)ethyl)]-2-phenyl-oxazolidine.

(8) A mixture of 1 part of N-[2-(2-acryloxyethoxy) ethyl]-5-methyl-oxazolidine, 85 parts of acrylonitrile, and 14 parts of butyl acrylate are dissolved in 300 parts of dimethylformamide. Four parts of benzoyl peroxide are added and the temperature of the mixture is controlled to maintain it at about 65° C. After eight hours, the solution is cast on cellophane and allowed to air-dry. The films are smooth, clear, and glossy. They show improved capacity for dyeing as compared to polyacrylonitrile films.

(9) A mixture of 5 parts of the monomer obtained in (4)(d) hereinabove, 2.5 parts of N-methylol-acrylamide, 1 part of acrylamide, 11.5 parts of vinyltoluene, and 80 parts of ethyl acrylate is copolymerized to form a 40% solids latex as in 2) above. The latex is applied to a nonwoven fabric formed of carded rayon fibers to provide 50% of the copolymer on the weight of fibers, yielding, after drying and heating at 240° F. for 30 minutes, a bonded fabric which is resistant to washing and drycleaning by perchloroethylene.

(10) Procedure (2) above is repeated except that:
(a) In one instance the oxazolidine of part 2) is replaced by the same proportion of 3-[2-(2-(methacryloxyethoxy)ethyl]-2,2-pentamethylene oxazolidine,
(b) In another instance, the oxazolidine is replaced by the same amount of 3-[2-(2-(methacryloxyethoxy) ethyl)]-2,2-dimethyl-oxazolidine, and
(c) In a third instance, the replacement is with 3-[2-(2-(methacryloxyethoxy)ethyl)]-2-phenyl-oxazolidine.

Coatings of similar properties are obtained when applied as in (2) above.

I claim:
1. A compound of the formula

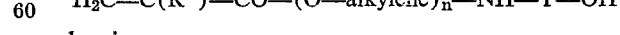

wherein
R° is H or methyl,
(—O—alkylene)$_n$ is a poly(oxyalkylene) group, having a molecular weight in the range from 88 to 348, in which the individual alkylene radicals are the same or different and are either ethylene or propylene, and
Y is ethylene or ethylene having one of its hydrogen atoms substituted by a methyl group.

2. An addition polymer of a compound as defined in claim 1 or of a salt of such a compound.

3. An addition copolymer of about ½ to 99½% by weight of a compound as defined in claim 1 with at least one other copolymerizable ethylenically unsaturated monomer containing a group of the formula $H_2C=C<$ in which the compound is in the form of free base or of a salt of an acid.

References Cited

UNITED STATES PATENTS 2,138,763  11/1938  Graves.
2,828,861  2/1958  Conbere et al.
3,037,006  5/1962  Hankins et al.

HARRY WONG, JR., Primary Examiner

U.S. Cl. X.R.

117—126, 142, 140, 132, 148, 169; 252—50; 260—89.5, 482, 88.3, 80.3, 307, 85.5, 86.7, 86.3, 836, 29.6, 80.81, 901, 80.73, 80.72, 80.76